United States Patent Office 2,911,395
Patented Nov. 3, 1959

2,911,395

HYDROGENATED PETROLEUM RESINS

Augustus Bailey Small, Baton Rouge, La., assignor to Esso Research and Engineering Company, a corporation of Delaware No Drawing. Application February 28, 1955
Serial No. 491,225

4 Claims. (Cl. 260—82)

This invention relates to improved petroleum resins, and methods of producing the same. More particularly, it relates to an improved method of making substantially water-white resins from cracked petroleum fractions, and is a continuation-in-part of now abandoned application Serial No. 280,669, filed April 4, 1952, in the name of Augustus B. Small.

Heretofore, numerous attempts have been made to produce resins from cracked petroleum fractions such as cracked naphthas by various methods, such as by treatment with active clay, Friedel-Crafts catalysts, or simple heating, etc. However, such resins are generally high in unsaturation and dark in color. This means that from a commercial point of view they have a very limited application and cannot compete in quality with light colored resins made from other types of materials which are more expensive. Petroleum naphtha fractions comprise mixtures of numerous homologues of materials falling in at least three or four major chemical classes, e.g., mono-olefins, diolefins, aromatic hydrocarbons, cyclic mono-olefins and cyclic diolefins, and perhaps others.

By the present invention, it is now possible to prepare substantially water-white resins from cracked petroleum fractions and especially from steam-cracked naphthas wherein the water-white resin is a hydrogenated petroleum hydrocarbon resin which is a hydrogenated polymerization product of a cyclodiene free steam-cracked petroleum fraction boiling within the range of about 50° F. to about 450° F.

According to the present invention, a steam-cracked naphtha or equivalent petroleum fraction is subjected to special treatment to reduce the cyclic diolefin content to less than 5% and preferably to less than 2%, then to special polymerization conditions, and the resulting polymer resin is finally subjected to preferred hydrogenation conditions to reduce the unsaturation, and to not only lighten the color, but to substantially completely remove the color, i.e., to make the resin substantially water-white.

According to one embodiment of the present invention, a substantially water-white petroleum hydrocarbon resin is prepared from a steam-cracked naphtha by heat soaking said fraction at a temperature of about 180° F. to 240° F. for a time sufficient to dimerize cyclodienes, recovering therefrom a cyclodiene-free distillate fraction, and subjecting this fraction to Friedel-Crafts polymerization at a temperature of about −150° F. to about +200° F. for a time sufficient to produce a resin having a softening point within the range of about 100° F.–300° F., and subsequently subjecting the resulting resin to hydrogenation under a pressure of about 100 to 5000 p.s.i.g. at a temperature of about 100° F. to 750° F., whereby to produce a resin having a substantially water-white color.

In a preferred embodiment of the present invention, a substantially water-white hydrocarbon resin is obtained from a steam-cracked naphtha fraction boiling within about 50° F. to 450° F., which fraction consists essentially of about 15–55 weight percent aromatic hydrocarbons, about 5–15 weight percent of cyclodienes, about 10–15 weight percent aliphatic diolefins, about 15–40 weight percent of mono-olefins, and about 0–5 weight percent unreactive paraffins. The water-white resin is produced by the process which comprises thermally soaking the above fraction at about 180° F. to 240° F. for about 2–24 hours to dimerize sufficient cyclodienes that the fraction contains less than 5%, and preferably less than 2%, cyclodienes, distilling the resulting product to remove said dimerized cyclodienes as bottoms, and recovering the overhead distillate. The overhead distillate is then subjected to continuous polymerization in the presence of an aluminum halide catalyst for a residence time of about .1 to 5 volumes of feed per volume of reactor per hour (preferably .3 to 2 v./v./hour) at a temperature of about −150° F. to about +250° F. to polymerize the reactive aliphatic diolefins and mono-olefins, whereby to produce a resin having a softening point of about 150° F. to 300° F., and is subsequently hydrogenated at about 300°–650° F. under a pressure of about 1000–3500 p.s.i.g. in the presence of a hydrogenation catalyst for a time sufficient to obtain a water-white resin having a color of less than 50 on the Hazen scale.

For the purposes of the present invention is it preferred to use as polymerization feed stock a steam-cracked naphtha having a boiling range of about 50°–450° F., preferably 100°–400° F., from which essentially all of the $C_4$ hydrocarbons have been removed, though one may also use one or more narrower fractions such as the 100°–300° F. fraction, the 300°–450° F. fraction, etc. It is also sometimes preferred to remove the isoprene from the naphtha.

Although the actual content of various chemical classes of hydrocarbons present may vary somewhat according to the type of crude oil from which the gas-oil fraction is being cracked, and according to the steam cracking conditions and fractionation conditions, nevertheless, in general, the desired debutanized steam-cracked naphtha fraction will have approximately the following range in composition:

| | Percent by weight |
|---|---|
| Benzene | 5–15 |
| Toluene | 5–10 |
| Higher aromatic hydrocarbons | 5–30 |
| Cyclic diolefins | 5–15 |
| Cyclic mono-olefins | 5–10 |
| Aliphatic diolefins | 10–15 |
| Aliphatic mono-olefins | 10–30 |
| Paraffins | 0–5 |

The above-described steam-cracked naphtha fraction may thus be considered one suitable original raw material for the present invention. This raw material is then subjected to a heat-soaking step, or other suitable method, for removing at least 95%, and preferably at least 98%, of the cyclic diolefins, i.e., chiefly cyclopentadiene and its close homologues such as methyl cyclopentadiene. Such a heat-soaking may be effected at a temperature of about 180°–240° F. for about 2–24 hours. For instance, at the lower temperature range, i.e., 180° F., the time may be about 12–24 hours, whereas at the higher temperature limit of 240° F. the time will be much shorter, i.e., about 2–4 hours. Generally, it is preferred to use a temperature of about 210°–230° F. with a time of about 5–10 hours.

After this heat-soaking treatment which chiefly causes the dimerization of the cyclopentadienes, the product is distilled to remove such dimers as bottoms. The distillate is thus substantially similar to the original raw material steam-cracked naphtha except that it is substantially free of cyclopentadiene. This product is now subjected to polymerization with a Friedel-Crafts catalyst such as aluminum chloride, boron fluoride, stannic chloride, titanium tetrachloride, aluminum bromide, or other Friedel-Crafts catalysts and complexes of which are known as Friedel-Crafts catalysts. This polymerization may be effected at a temperature of about −150° F. to about +200° F., preferably about 70°–130° F.

The amount of catalyst to be used will vary somewhat inversely according to the temperature, and somewhat according to the composition of the polymerization feed, but normally should be about 0.1–5.0%, preferably 0.5–2.0%, by weight based on the approximate proportion of polymerizable constituents in the feed. This polymerization, for simplicity of operation, may be applied directly to the decyclopentadienized distillate without removal of any of the volatile constituents thereof which may be inert to the polymerization catalyst. After the polymerization has been effected, the resulting resin may either be removed simply by normal distillation or steam-stripping of the volatile solvent or it may be retained in solution in said volatile constituents, to serve as solvent and diluent for the subsequent hydrogenation step.

The polymer resin prior to hydrogenation will have a diluted Gardner color ranging from about 1 to 5, and has a softening point range from about 100°–300° F., usually about 150°–225° F., and its iodine number (ASTM) is about 200 to 400, usually about 250 to 300.

Now the next step in the present invention is the hydrogenation. This may be carried out in the resin solution directly as the resin comes from the polymerization step, although it may be washed or otherwise treated to remove the residual catalyst. Also, the polymer resin may be treated by stripping at low pressure to remove not only volatile solvents but also low molecular weight oily products sufficiently volatile to be removed by such stripping. If the resin is recovered from the volatile constituents, it may be either melted and hydrogenated as such, or redissolved in a suitable solvent, preferably a hydro-inert solvent such as hexane or paraffinic hydrocarbon fraction of somewhat similar boiling range, to reduce hydrogen consumption. The concentration of such solution may vary from about 10 to 70 weight percent by weight of resin for the hydrogenation step, or even up to 100% resin, meaning that the melted resin may be hydrogenated per se. For ease in handling, the resin is preferably solvated in about .5 to 4 parts by weight of an inert hydrocarbon diluent.

The hydrogenation is then effected under a pressure of about 100–5000 p.s.i.g., advantageously about 50–3000 p.s.i.g., and most preferably from about 1000–3000 p.s.i.g., at temperatures of 100°–750° F. and preferably about 300°–500° F., for a few minutes up to 30 hours or more, but preferably about 1 to 20 hours, and most advantageously for about 3–8 hours, in the presence of a suitable hydrogenation catalyst to include group VI and VIII metals and compounds or other catalysts such as nickel, reduced nickel, nickel sulfides, copper chromite, cobalt molybdate, molybdenum sulfide, or various catalysts supported on light porous or granular particles of large surface area such as alumina, pumice, clays, charcoal, etc. The hydrogenation may be carried out batchwise or continuously. The amount of catalyst in a batch operation generally is about 5 to 50 percent by weight based on the amount of resin being subjected to hydrogenation. If continuous hydrogenation is used, the feed rate of resin solution through the catalyst bed should be about 0.1 to 5.0, preferably about 0.3 to 1.0 v./v./hr., i.e., volumes of liquid feed per volume of reactor per hour. The extent of the hydrogenation may be determined by either the pressure drop caused by hydrogen consumption or by periodic examination of samples of the resin solution during the course of the hydrogenation.

When the hydrogenation has been completed, the resin solution may be either stored and shipped as such or may be subjected to stripping under low pressure, e.g., steam stripping or vacuum stripping, to remove the volatile solvent as well as any other low molecular weight substances present. It is important, however, that the hydrogenation process be effected under conditions sufficiently stringent only to form a substantially water-white color in the resin, but without any large reduction in softening point in the resin or any other substantial degradation thereof.

The resulting hydrogenated resin, according to the invention, has a Gardner color, in the 100% solids state, of less than 1 and on the Hazen scale of less than 100, and preferably less than about 50, and is water-white. It has been found that the decyclopentadienizing treatment applied before polymerization, and the use of a Friedel-Crafts catalyst to effect the polymerization cooperate to give a polymer resin particularly susceptible to decolorizing by a hydrogenation treatment not nearly strong enough to cause complete chemical saturation.

The hydrogenated resin is completely soluble in petroleum hydrocarbons such as hexane and mixed paraffinic hydrocarbons of the volatile naphtha boiling range, and also in aromatic hydrocarbons such as benzene, toluene, xylene, etc., or mixed aromatic fractions as obtained by thermal or catalytic cracking of petroleum gas oil fractions. However, these resins are either substantially insoluble or only have a low solubility in low molecular weight organic solvents such as methanol, ethanol, isopropanol, acetone, methylethylketone, ether, etc. In general, their molecular weight is believed to be in the range of 500–2000, and generally about 1000–1500.

It is not intended that this invention be limited unnecessarily by speculation as to any theory as to mechanism of the operation of the invention. However, as a possible explanation, it is suggested that the removal of cyclopentadiene type compounds prior to polymerization is responsible for reducing the amount of three-dimensional cross-linking or mesh type structure in the resulting polymer, and this in turn may not only per se reduce the amount of color-forming bodies in the polymer resin, but may alter the chemical structure of such color-forming substances so that the subsequent hydrogenation is enabled to more easily eliminate the color with relatively little reduction in iodine number and relatively little breakdown of the main molecular structure of the resin, i.e., with little reduction in either softening point or molecular weight.

The objects, advantages, and details of the invention will be better understood from the following experimental data.

RUN A

The feed or raw material which was subjected to batch polymerization was made by steam-cracking a gas oil petroleum fraction derived from a paraffinic type crude, the cracking being carried out at a temperature of about 1200°–1300° F. and a pressure of 10–20 p.s.i.g. in the presence of about 70–75 mol percent of steam.

The approximate analysis of the resultant steam-cracked naphtha, after debutanizing, was as follows:

| | Volume percent |
|---|---|
| $C_5$ cyclodiolefins | 5 |
| Aliphatic $C_5$ diolefins | 5 |
| $C_5$ olefins | 20–21 |
| $C_{6-8}$ diolefins | 8–10 |
| $C_{6-8}$ olefins | 14–15 |
| $C_{9-12}$ diolefins | 3 |
| $C_{9-12}$ olefins | 4 |
| Benzene | 15 |
| Toluene | 10 |
| Xylenes | 2–3 |
| $C_{9-12}$ aromatics | 5–6 |
| Paraffins | 3 |

This steam-cracked naphtha was then subjected to further distillation to remove substantially all of the isoprene overhead and also to remove most of the $C_8$ and higher hydrocarbons as bottoms.

The product now had approximately the following analysis:

| | Volume percent |
|---|---|
| $C_5$ paraffins | 1 |
| $C_5$ cyclic diolefins | 6 |
| $C_5$ piperylene (cis and trans) | 6 |
| $C_5$ tert. olefins | 8 |
| $C_5$ cyclopentene | 2 |
| $C_5$ other aliphatic olefins | 1 |
| $C_6$ benzene | 24 |
| $C_6$ hexadiene | 8 |
| $C_6$ cyclohexene | 6 |
| $C_6$ paraffins | 2 |
| $C_6$ N-olefins | 13 |
| $C_6$ tert. olefins | 5 |
| Toluene | 7 |
| $C_7$ diolefins (mostly aliphatic) | 1 |
| $C_7$ cyclic olefins | 1 |
| $C_7$ N-olefins | 5 |
| $C_7$ tert. olefins | 2 |
| $C_{8-9}$ olefins and diolefins (including trace of aromatics) | 2 |

This product was then subjected to heat-soaking at 220° F. for about 6–8 hours to effect dimerization of cyclopentadiene and its lower alkyl homologues such as methyl cyclopentadiene. The resulting product was subjected to distillation to remove the dicyclopentadiene products as bottoms. The overhead was condensed and analyzed and found to contain less than 2% cyclodienes as compared to 6% prior to dimerization and was subjected to Friedel-Crafts polymerization at a temperature of about 100°–120° F. for two hours, using 1% by weight of aluminum chloride (based on the total feed) as catalyst. The resulting polymerization product was then subjected to various types of washing and recovery treatments, and hydrogenated under various conditions, as will be discussed in more detail hereinafter.

*Examples 1 and 2*

One sample of the above described polymerization product of Run A was refined by simple water washing and then hydrogenated with 10 volume percent of a Raney nickel catalyst (equivalent to 10–20 weight percent catalyst depending on gravity of feed) at 350° F., a pressure of 2000 p.s.i.g., and then subjected to stripping at a temperature up to 500° F. to recover the dry resin.

The pertinent operating and test data are shown in the following table:

| | Example 1 | Example 2 |
|---|---|---|
| Hydrogenation Conditions: | | |
| Reaction Time (Hours) | 5 | 7. |
| Hydrogen Consumed | 2,800 | 2,700. |
| Hydrogenated Product: Hazen Color Scale | 10 | 0. |
| Resin: | | |
| Recovery Conditions— | | |
| Pressure | 1–2 mm. absolute. | Atmospheric. |
| Stripping | $N_2$ Gas | Steam. |
| Yield, Weight Percent | 19.3 | |
| Softening Point, ° F | 150 | 175. |
| Color Gardner 50% Dilution | <1 | <1. |

The resin feed to the hydrogenation unit contained 22 weight percent of resin, the remaining constituents being those listed in the previous tabulation which were not polymerizable. The hydrogen consumed is determined by the accumulative pressure drop during hydrogenation. The color (Hazen scale) of the "hydrogenated product" means the color of the resin solution recovered from hydrogenation. On this Hazen scale, 500 is equivalent to a Barrett scale color of 2, and was equivalent roughly to diluted Gardner scale of color of 2. By diluted Gardner scale color is meant the color of a solution of one gram of dry resin dissolved in 67 cc. xylene.

In Examples 1 and 2 the dry resin before hydrogenation had a softening point of 150° F. and an iodine number of 250. After hydrogenation in Example 1, the softening point, as shown, was 150° F., and the iodine number was 91. In both cases the hydrogenated product (before removal of volatile constituents) had an absolute water-white color (less than 20 on the Hazen scale). After removal of volatile constituents, the dry resin had a Gardner color less than 1 (i.e., equivalent to less than about 300 on the Hazen scale). In comparing Examples 1 and 2 with each other, it may be noted that the slightly longer hydrogenation time in Example 2 is probably responsible for producing an absolutely colorless hydrogenation product, and the steam-stripping apparently is sufficiently more effective than the gas-stripping to remove slightly more volatile constituents and thereby raising the softening point of the final recovered resin up to 175° F.

*Examples 3, 4, and 5*

These three examples were made similarly to Examples 1 and 2 through the Friedel-Crafts polymerization step, but they received different washing and hydrogenation treatments, as indicated in the following table, which also shows the inspections in the final hydrogenated resin. In all three of these tests the hydrogenation catalyst, temperature, and pressure were the same as in Examples 1 and 2.

| | Example 3 | Example 4 | Example 5 |
|---|---|---|---|
| Feed (Polymerization prod.): | | | |
| Treatment | Neutralized | Acid and Water. | Water. |
| Resin Content, Wt. Percent | 50 | 30 | 22. |
| Hydrogenation Conditions: | | | |
| Reaction Times (Hours) | 7 | 9 | 10. |
| Hydrogen Consumed | 2,050 | 2,200 | 3,000. |
| Hydrogenated Product: Color Hazen Scale. | 70 | 55 | 20. |
| Resin: | | | |
| Recovery Conditions— | | | |
| Pressure | Atmospheric | 1–2 mm | 1–2 mm. |
| Stripping | Steam | $N_2$ Gas | $N_2$ Gas. |
| Yield, Wt. Percent | 45.2 | 31.2 | 16.3. |
| Softening Point, ° F | 176 | 181 | 173. |
| Color Gardner 50% Dilution | <1 | <1 | <1. |

In this table the term "neutralized" means first washed with 10 volume percent of sulfuric acid (5% concentration) containing 0.06% by weight of a commercial detergent called "Ethofat 245–25," then water-washed, and finally neutralized with 10 volume percent of aqueous sodium carbonate (10% concentration) containing 0.25% of commercial detergent called "Santomerse No. 1."

In Example 3, the resin content of feed, i.e., 50%, resulted from a partial concentration to remove a portion of the volatile constituents. This results in a relatively high concentration of the unsaturated resin as well as of the unsaturated higher boiling liquid but still slightly volatile polymerization products. Comparing Examples 3, 4, and 5, it is noted that as the resin content of the feed is decreased from 50 to 30 to 22, respectively, the Hazen scale color of the hydrogenation product decreases in a parallel manner from 70 to 55 to 20, respectively. This shows that the hydrogenation appears to be more effective on the more dilute solution of the polymerization product. However, all three of these hydrogenated products would class as "substantially water-white," by which is meant having a Hazen color less than 100.

Examples 6–9

These four test runs were made on a composite of several different specific polymerization products, but all made with the same general procedure as described in Examples 1 and 2. This composite polymerization product, however, was refined by "neutralizing," and then steam-stripped to a dry resin and then redissolved in a concentration of 34% by weight in "Varsol" (straight run mineral spirits) which is a refined substantially inert petroleum hydrocarbon solvent having a boiling range of about 300°–400° F. In each case the hydrogenation was carried out in the presence of the same catalyst, i.e., 10% of nickel, as in Examples 1–5, but the temperatures and pressures were varied as shown in the following table:

|  | Control | Examples | | | |
|---|---|---|---|---|---|
|  |  | 6 | 7 | 8 | 9 |
| Hydrogenation Conditions: |  |  |  |  |  |
| Temperature, ° F |  | 350 | 450 | 450 | 450. |
| Pressure, P.s.i.g |  | 2,000 | [1] 300 | 600 | 2,000. |
| Reaction Time (Hours) |  | 5 | 8.5 | 5 | 4. |
| Hydrogen Consumed |  | 150 | 525 | 375 | 200–400. |
| Resin: |  |  |  |  |  |
| Recovery Conditions— |  |  |  |  |  |
| Maximum Temp., ° F | 500 | 500 |  |  | 350. |
| Pressure, Absolute | 1–2 mm | 1–2 mm |  |  | 500–100 mm. |
| Stripping | $N_2$ Gas | $N_2$ Gas |  |  | Steam. |
| Yield, Wt. Percent | 33.9 | 32.2 |  |  |  |
| Softening Point, ° F | 149 | 150 |  |  | 180. |
| Color Gardner, (50% Dilution) | 4 | <1 | <1 | <1 | <1. |

[1] Pressure inadvertently raised to 50 p.s.i.g. at one hour from end of hydrogenation.

For the sake of comparison, a control sample is shown above in which the composite resin solution, exactly as used as feed for the hydrogenation, was subjected directly to a stripping recovery without hydrogenation, to see whether the hydrogenation had any effect on the softening point and yield of the resin. Comparison of the data in this control sample with the yield data in Example 6 indicates that the hydrogenation did not have any substantial effect on either the yield or the softening point of the resin.

In all four of Examples 6 to 9, the hydrogenated product (still containing the volatile solvent) had an estimated Hazen scale color of less than 20. This excellent result is quite remarkable in view of the fact that the hydrogen consumed was relatively low, i.e., ranging from 150 (in Example 6) to 525 (in Example 7). This means that when the resin polymerization mixture is stripped to remove volatile constituents and the dry resin is redissolved in an inert solvent for the hydrogenation step, a relatively small amount of hydrogen is required to convert the resin from a yellow-amber color to a water-white color. Comparison of Examples 7 and 8 with Example 6 showed that the increased hydrogenation temperature of 450, compared to 350, is quite effective in permitting the use of a much lower hydrogenation pressure (i.e., only 300–600 in Examples 7 and 8 compared to 2000 in Example 6).

In Example 9 a lower final temperature of solvent stripping was used, i.e., 350° F. compared to 500° F. in the previous examples, and this is believed helpful in avoiding any possibility of thermal degradation or coloring of the hydrogenated resin during the solvent stripping step.

The following additional data is presented to show that the color of hydrogenated petroleum resin prepared in accordance with the invention is far superior to the color of resins prepared from feed stocks containing substantial amounts of cyclodienes.

RUN B

The feed or raw material which was subjected to continuous polymerization was made by steam-cracking a gas oil petroleum fraction derived from a paraffinic type crude; the cracking conditions, pressure and mol percent of steam being identical with Run A, supra, and the approximate analysis of the steam-cracked naphtha after debutanizing also being identical.

The steam-cracked naphtha was then subjected to further distillation as in Run A to remove substantially all of the isoprene, and the resulting product also had the identical analysis as in Run A, i.e., the $C_5$ cyclic diolefins were present in an amount of 6 volume percent, etc.

This product was then subjected to heat soaking at 220° F. for about 6 to 8 hours to effect dimerization of cyclopentadiene and its lower alkyl homologues such as methylcyclopentadiene. The resulting product was then subjected to distillation to remove cyclopentadienes as bottoms. The overhead was condensed and subjected to Friedel-Crafts polymerization at a temperature of about 100°–120° F. for two hours using 1% by weight of aluminum chloride (based on the total feed) as catalyst.

The polymerization product was produced likewise under the same polymerization conditions as in Run A, supra, except that the process was run continuously instead of batchwise and at a residence time of one volume of feed per volume of reactor per hour. The resulting polymerization product was then stripped until it was substantially dry with $N_2$ gas at 500° F. under 1–2 millimeters absolute pressure prior to hydrogenation. The hydrogenation was also performed under the conditions of Run A except that the polymerization product was dried and then diluted with approximately an equal volume of n-heptane prior to hydrogenation, the results

HYDROGENATION OF RESIN (EXAMPLE 10)

| Test No. | Resin Properties (Before Hydrogenation) | | | Hydrogenation Conditions | | | Hydrogenated Resin Properties [a] | |
|---|---|---|---|---|---|---|---|---|
| | Prepn. from [b]— | Soft. Pt., °F. | Gardner Color, 50% Sol. | Press., P.s.i.g. $H_2$ | Temp., °F. | Time, Hrs. | Soft. Pt., °F. | Gardner Color, 50% Sol. |
| Ex. 10 | Resin of Run B [c] | 202 | 12 | 1,800 | 482 | 6 | 191 | [d]<1 |
| Run 1 | Resin of Run B [c]+5% CPD | 217 | 11 | 1,430 | 428 | 6 | 225 | [e] 1 |
| Run 2 | Resin of Run B [c]+5% CPD+5% MCPD | 245 | 18 | 1,500 | 536 | 7 | 237 | [f] 5 |
| Run 3 | Resin of Run B [c]+10% MCPD | 227 | 16 | 1,500 | 455 | 7 | 207 | [f] 6 |
| Run 4 | Resin of Run B [c]+15% CPD | 234 | 10.5 | 1,200 | 437 | 6 | 228 | [f] 9.5 |
| Run 5 | Resin of Run B [c]+15% CPD | 234 | 10.5 | 1,300 | 482 | 7 | 208 | [f] 3.5 |
| Run 6 | Resin of Run B [c]+15% CPD | 235 | 11 | 2,500 | 500 | 6 | 185 | [e] 1 |
| Run 7 | Resin of Run B [c]+10% DMCPD[g] | 227 | 12.5 | 2,900 | 527 | 4.5 | 205 | [e] 1 |
| Run 8 | Resin of Run B [c]+4% CPD+3.5% MCPD | 221 | 13.5 | 1,800 | 527 | 6 | 207 | [f] 5 |

[a] Hydrogenated resin recovered by stripping out heptane diluent at 350°–365° F. Btm. Temp. at 10–15 mm. pressure absolute with $N_2$ bubbling.
[b] All resins were obtained by continuous polymerization.
[c] Resin of Run B containing less than 2% cyclodienes after thermal soaking.
[d] Water-white.
[e] Yellowish tint.
[f] Amber.
[g] Dimerized MCPD.

By comparing Example 10 and runs 1–8 of the foregoing table, it is shown that a substantially water-white hydrocarbon resin is prepared when the feed to the polymerization zone contains less than about 5 weight percent, and preferably less than about 2 weight percent, of cyclodiolefins. For instance, only Example 10, which contains less than 2 weight percent cyclodienes, produced a water-white resin upon hydrogenation, whereas even the inclusion of as little as 5% cyclopentadiene as in run 1 resulted in a resin having a pronounced yellowish tint. Also, when employing 10% methyl cyclopentadiene, as in run 3, the resulting resin had a Gardner color of 6 and was amber in color. Furthermore, when the resin feed contained a combination of 4–5% cyclopentadiene and 3.5–5% methyl cyclopentadiene, the color of the resin was also amber and had a Gardner color of 5 (see runs 2 and 8).

Thus it will be noted that the hydrogenated resin prepared according to this invention from a steam-cracked hydrocarbon feed containing less than 2% cyclodienes has a Gardner color of less than 1 and is water-white (see Example 10), whereas in all other cases where the cyclodiolefin content of the resin feed was 5 weight percent or more the color varied from yellowish to amber and was never a "water-white" resin upon hydrogenation thereof.

It is not intended that the invention be limited to the specific examples, which have been given merely for the sake of illustration, since obviously resort may be had to various modifications and variations without departing from the spirit of the invention or the scope of the appended claims.

What is claimed is:

1. A process of preparing a substantially water-white hydrocarbon resin from a steam-cracked naphtha fraction boiling within about 50°–450° F. having the following composition:

| | Parts by weight |
|---|---|
| Benzene | 5–15 |
| Toluene | 5–10 |
| Higher aromatic hydrocarbons | 5–30 |
| Cyclic diolefins | 5–15 |
| Cyclic mono-olefins | 5–10 |
| Aliphatic diolefins | 10–15 |
| Aliphatic mono-olefins | 10–30 |
| Paraffins | 0–5 | which comprises subjecting said fraction to thermal soaking at about 180°–240° F. for about 2–24 hours to dimerize the cyclodienes, distilling the overhead product and removing said dimerized cyclodienes as bottoms, subjecting the overhead product containing less than about 5 weight percent cyclic dienes to continuous polymerization in the presence of an aluminum halide catalyst for a residence time of about 0.5 to 3.0 volumes of feed per volume of reactor per hour and at a temperature of about −150° F. to +200° F. to polymerize the resin-forming constituents whereby to produce a resin having a softening point within the range of about 100°–300° F. and subjecting the resulting resin to hydrogenation under a pressure of about 100–5000 p.s.i.g at a temperature of about 300–650° F. in the presence of a hydrogenation catalyst to reduce the color of the resin to substantially water-white.

2. The process of claim 1 in which the cyclodiene concentration is reduced to below about 2%, the hydrogenation is performed at between about 350° F. and 550° F., and at a pressure between about 1000 and 3000 p.s.i.g. in the presence of reduced nickel as a hydrogenation catalyst, whereby a hydrogenation product, still containing volatile constituents, is obtained having a color of less than about 30 on the Hazen scale.

3. The process of making improved water-white petroleum hydrocarbon resins which comprises subjecting, to hydrogenation under a pressure of about 300–3500 p.s.i.g. and a temperature of about 300°–700° F. in the presence of nickel as a hydrogenation catalyst, a solution of a resin in about 22% to 50% by weight concentration in an inert volatile hydrocarbon liquid, said resin being a solid petroleum hydrocarbon resin having a softening point of about 100°–300° F., which is an aluminum halide polymerization product of a steam-cracked petroleum fraction boiling within the range of about 50°–450° F. consisting essentially of:

| | Weight percent |
|---|---|
| Benzene | 5–15 |
| Toluene | 5–10 |
| Higher aromatic hydrocarbons | 5–30 |
| Cyclic diolefins | 5–15 |
| Cyclic mono-olefins | 5–10 |
| Aliphatic diolefins | 10–15 |
| Aliphatic mono-olefins | 10–30 |
| Paraffins | 0–5 | from which substantially all of the cyclic diolefins have been removed to yield a resulting fraction containing less than about 2 weight percent of cyclic diolefins; whereby there is produced a hydrogenated petroleum resin solution having a Hazen color of less than 20, said hydrogenated petroleum resin per se being water-white and having a Hazen color of less than 100.

4. Process according to claim 3 in which the resin polymerization product prior to hydrogenation, by stripping under reduced pressure, is freed from volatile constituents which had been present but did not resinify during the polymerization, and the resulting dry resin is redissolved in a paraffinic hydrocarbon solvent.

References Cited in the file of this patent

UNITED STATES PATENTS

| | | |
|---|---|---|
| 2,062,845 | Thomas et al. | Dec. 1, 1936 |
| 2,092,889 | Mikeska | Sept. 14, 1937 |
| 2,150,641 | Thomas et al. | Mar. 14, 1939 |
| 2,211,938 | Ward | Aug. 13, 1940 |
| 2,349,418 | Glowacki | May 13, 1944 |
| 2,514,714 | Marhofer | July 11, 1950 |
| 2,734,046 | Nelson et al. | Feb. 7, 1956 |
| 2,824,860 | Aldridge et al. | Feb. 25, 1958 |